United States Patent [19]
Jonsson

[11] 3,976,111
[45] Aug. 24, 1976

[54] TREE-CUTTING DEVICE FOR LUMBERING MACHINE

[75] Inventor: Bror Allan Jonsson, Vindeln, Sweden

[73] Assignee: Cranab Aktiebolag, Vindeln, Sweden

[22] Filed: Sept. 17, 1975

[21] Appl. No.: 614,296

[30] Foreign Application Priority Data
Oct. 31, 1974 Sweden............................ 7413711

[52] U.S. Cl.............................. 144/34 R; 144/3 D; 83/928; 83/795; 83/51; 144/309 AC; 144/34 E
[51] Int. Cl.²........................................ A01G 23/08
[58] Field of Search............... 144/34 R, 34 E, 3 D, 144/309 AC; 83/928, 795, 51

[56] References Cited
UNITED STATES PATENTS

| | | | |
|---|---|---|---|
| 3,610,301 | 10/1971 | Jordan................................ | 144/34 E |
| 3,851,686 | 12/1974 | Hultdin et al..................... | 144/34 R |
| 3,854,510 | 12/1974 | Matlik................................ | 144/34 R |
| 3,885,610 | 5/1975 | Forslund et al................... | 144/34 R |

*Primary Examiner*—Donald R. Schran
*Attorney, Agent, or Firm*—Fred Philpitt

[57] ABSTRACT

A tree-cutting device for lumbering machines comprises a holder structure capable of being brought into contact with a tree to be felled, a swingable chain saw operable to saw only partially through the trunk of said tree, and a movable sharp-edged cutting blade operable to subsequently cut off the remainder of the tree trunk left by the chain saw. In order to assure most favorable operating conditions and minimize damage to the wood in the root end of the tree trunk, the chain saw is pivotally mounted in a sheltering structure forming a swingable gripping arm operable to press the tree trunk against a rigid part of the holder structure, while the cutting blade is projectable along a straight path in a plane forming an oblique angle to the plane of swing of the chain saw from a sheltered inoperative position within said rigid part of the holder structure.

7 Claims, 4 Drawing Figures

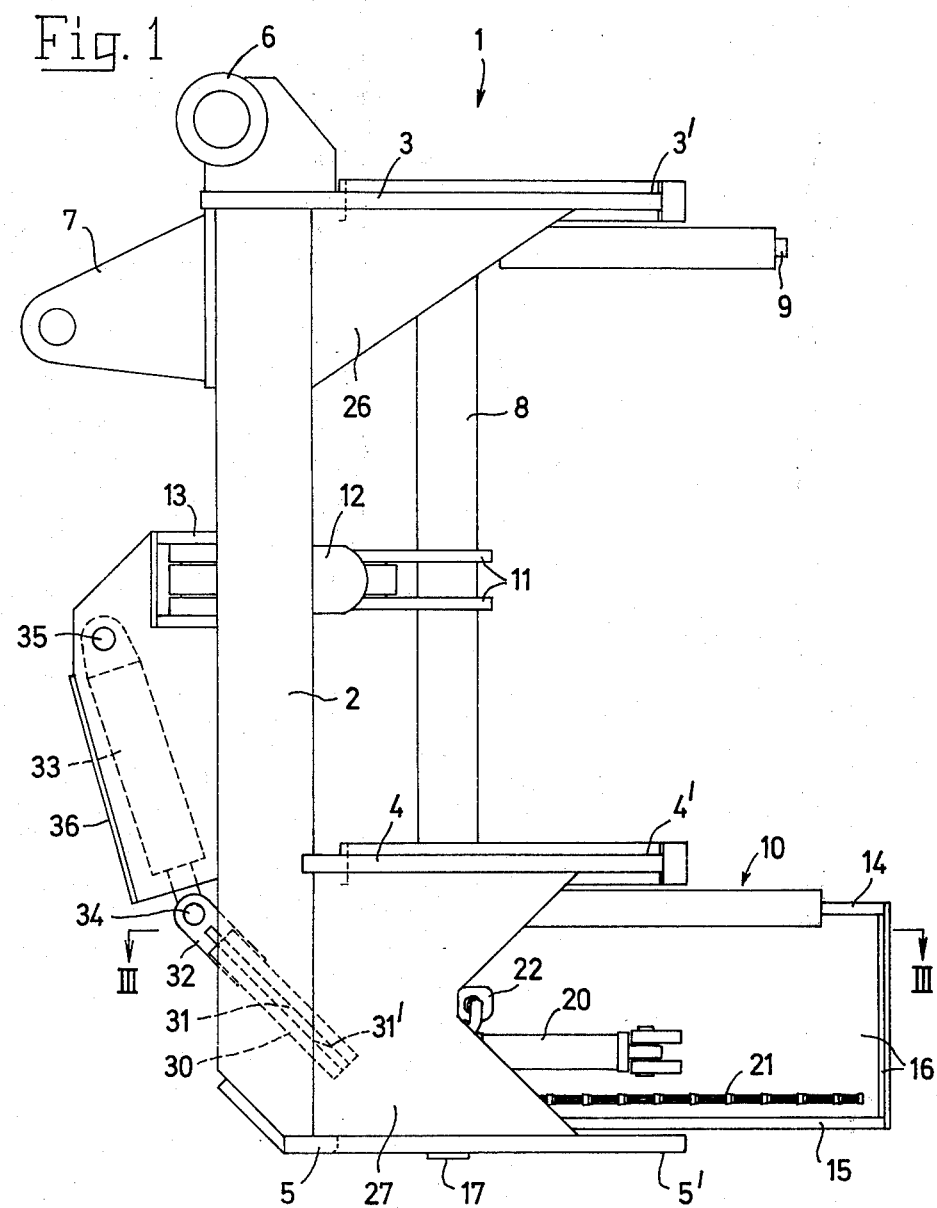

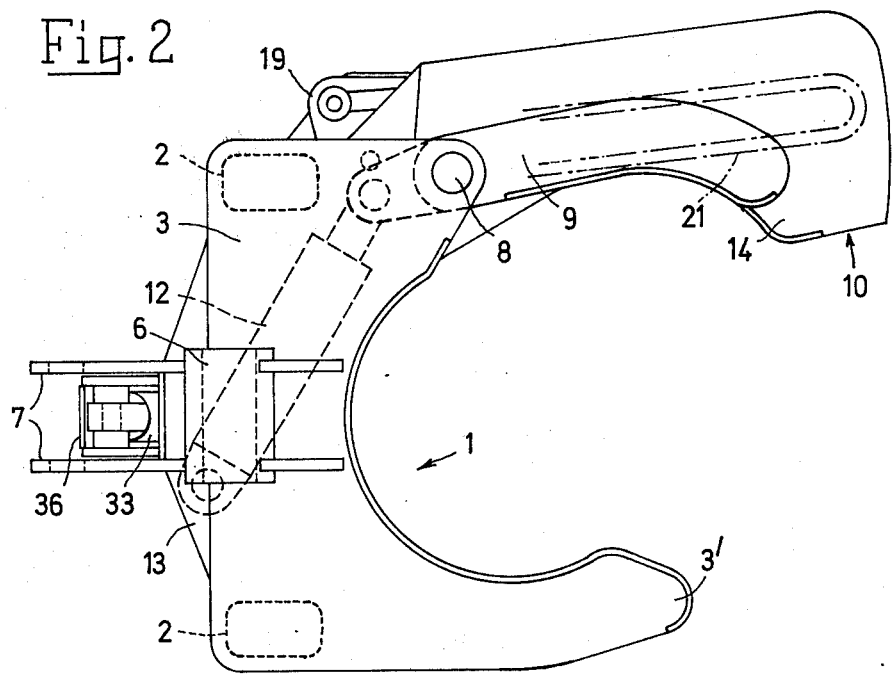
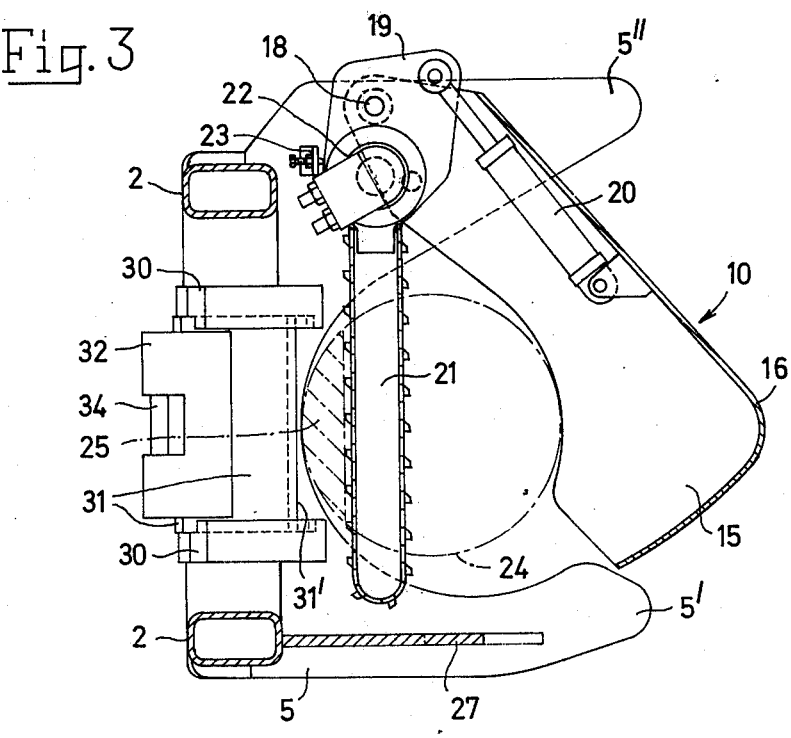

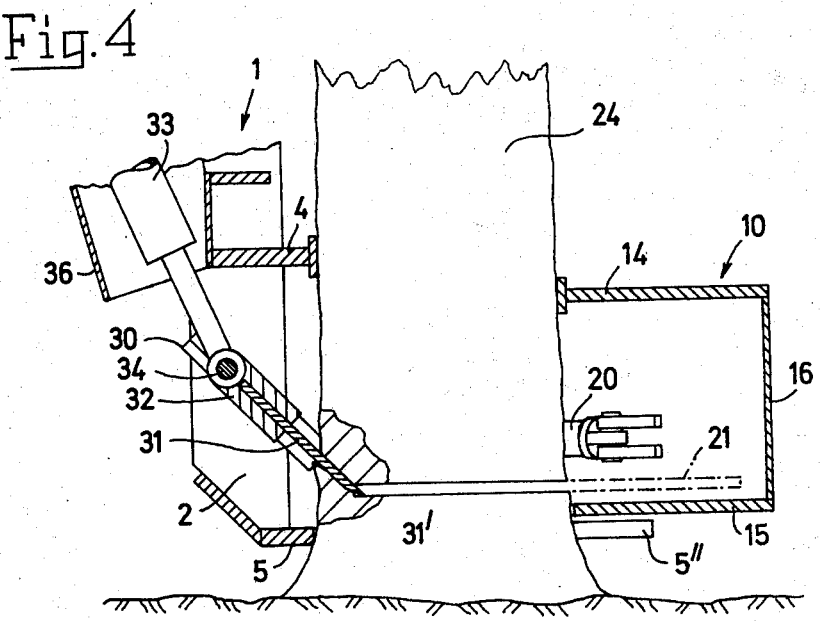

TREE-CUTTING DEVICE FOR LUMBERING MACHINE

This invention relates to a tree-cutting device for lumbering machines and, more specifically, to a tree-cutting device of the kind comprising a holder adapted to be moved up to and pressed against the trunk of a tree to be felled, a chain saw pivotally mounted in said holder to swing in a substantially horizontal plane relative thereto, said chain saw having a protected position of rest and being operable, when swung out therefrom, to saw through the tree trunk only partially from one side thereof for then to return to said protected position of rest, and a sharp-edged cutting blade guided in said holder to move in a predetermined plane relative thereto, said cutting blade being operable to penetrate into the tree trunk from generally the opposite side thereof for cutting off the remainder of the trunk left by the chain saw to thereby complete the separation of the trunk from its root.

A tree-cutting device of the kind just referred to is previously disclosed in the U.S. Pat. No. 3,610,301 to Jordan. However, in this known device the sharp-edged cutting blade is, like the chain saw, movable in a substantially horizontal plane that coincides with or is parallel to the plane of swing of the chain saw, whereby it will act by pure shearing, and the blade is also pivotally mounted in the holder to swing about a substantially vertical axis that preferably coincides with the pivot axis of the chain saw, whereby it will, during its operation, give rise to forces tending to separate the holder from the trunk. Furthermore, the cutting blade of the known device has a sharp edge that is permanently exposed and, in fact, serving as a sort of counterholder for the tree trunk during the operation of the chain saw, whereby it is easily dulled and damaged. All this is highly objectionable.

Accordingly, although the prior art thus teaches that, in order to prevent jamming of and damage to the chain saw, the tree trunk shall not be entirely separated from its root by sawing, but instead the chain saw shall be returned to its protected position of rest while the tree trunk has still such a firm connection with the root that the risk of uncontrolled movements of the tree trunk is very small, before the trunk is finally separated from the root by means of the cutting blade, which is less susceptible to being damaged by jamming, it has been found that the actual device according to said prior art is rather unsuitable for its purpose. Thus, one of its major inconveniences is that its cutting blade is liable to seriously damage the root end of the trunk by the fact that its cutting edge, when penetrating into the trunk at right angle to the fiber-direction therein, will objectionably crush and split the wood. These wood damages will, of course, be considerably increased, if the cutting edge of the blade is not extremely sharp, and with its exposed position it cannot be kept so for a reasonable period of time but needs resharpening at objectionably short intervals. Still another inconvenience with the known device is that it permits and actually contributes to the occurrence of uncontrolled movements between the tree trunk and the device, particularly during the operation of the cutting blade.

The object of the present invention is to provide a tree-cutting device of the kind referred to hereinbefore, in which all those inconveniences of the known art are eliminated and in which substantial structural improvements assure a favorable operation from all points of view.

With this object in view the present invention primarily suggests the specific improvement of the prior art device already defined which consists in that the plane of movement of the cutting blade forms an oblique angle to the plane of swing of the chain saw and intersects said latter plane at least approximately along the line, to which the chain saw reaches, i.e. enters the tree trunk, during its operative stroke.

This will practically entirely eliminate all damages to the wood, since the oblique cutting of the remainder of the tree trunk left by the chain saw requires a substantially less force than pure shearing, i.e. cross cutting, and gives the wood a possibility of bending aside from the penetrating blade rather than being crushed. Furthermore, it makes it possible to leave that slightly distorted portion of the tree trunk behind on the tree stump, thus making a subsequent cleancutting of the root end of the trunk entirely superfluous.

Furthermore the invention suggests the additional improvement that the cutting blade in its inoperative position has its sharp cutting edge retracted in relation to surrounding parts of the holder and thus protected thereby. This will assure that the cutting edge of the blade maintains its sharpness for a maximum period of time and that the final cutting or hewing away of the remainder of the tree trunk after the completed work of the chain saw will take place under the most favorable conditions conceivable. Furthermore there is achieved a protected location of the driving mechanism of the cutting blade and, at the same time, a compact construction of the entire device.

For a further elucidation of the invention a preferred form of a tree-cutting device embodying the same will now be described with reference to the accompanying drawings, in which FIG. 1 is a side elevation of the improved tree-cutting device, FIG. 2 is a top view of the same device, FIG. 3 is a horizontal section taken substantially along the line III—III in FIG. 1 but showing the parts of the device during the performance of the first operating step thereof, and FIG. 4 is a partial and somewhat simplified sectional elevation illustrating the second operating step of the device.

The tree-cutting device illustrated in the drawings, which is intended to be mounted on and carried by a lumbering machine (not shown), preferably at the forward or outer end of a vertically movable supporting arm projecting from said machine, comprises primarily a holder that is generally designated by 1. This holder is built up from two rear vertical columns 2 and three substantially horizontal plates 3, 4, and 5. The rear part of the holder thus composed forms a rigid back structure having at its top an attachment 6 for its hinged connection to the lumbering machine or, preferably, the supporting arm thereof, and on its back further below a lug attachment 7 for the outer end of a hydraulic actuator (not shown) extending from the machine for folding or tilting the holder 1 in a vertical plane. The two upper ones, 3 and 4, of the three horizontal plates which are all rigidly secured to the columns 2 at different levels, are substantially identical in shape and differ from each other only with respect to minor details in their attachment to the columns. As best appears from FIG. 2 these two plates have in front, i.e. on the right-hand side facing away from the lumbering machine, a substantially semi-circular incut opening forwardly in a slightly oblique sideways direction by the fact that the plate on one side of the incut forms a forwardly extending shank 3' and 4', respectively.

The lower holder plate 5 has in its turn, as appears from FIG. 3, likewise a substantially U-shaped incut in front which also opens forwardly in a slightly oblique sideways direction, but this incut is bordered on one side by a forwardly extending shank 5' and on the opposite side by an extension 5'' having an oblique inner edge. Between the plates 3 and 4 there is journalled a heavy vertical shaft 8 carrying adjacent its upper end a gripping arm 9 that is acting immediately below the upper plate 3 and is rigidly connected to the shaft. The lower end of the shaft 8 projects downwardly through the plate 4 and is immediately below the latter connected to a swingable cap-like sheltering member 10 forming a second or lower gripping arm. Between its ends the shaft 8 has secured to it a pair of fixed arms or lugs 11, with which one end of a hydraulic actuator 12 is hingedly connected. The other end of this actuator 12 is hingedly connected to a fixture 13 mounted between the columns 2, whereby the actuator is operable to positively turn the shaft 8 a limited angle, and hence, to swing the gripping arm 9 and the member 10 jointly in order to cause them to grip, or to release respectively, in cooperation with the shanks 3' and 4' of the plates 3 and 4, a tree trunk, as will be described later on.

The cap-like sheltering member 10 is composed of an upper plate 14 forming the lower gripping arm proper and a somewhat corresponding lower plate 15, and between these two plates there is externally secured a curved, vertically extending shield-plate 16 (see FIG. 3). The upper plate 14 is rigidly connected to the lower end of the shaft 8, whereas the lower plate 15 is swingably mounted on top of the fixed holder plate 5 by means of a short pivot pin 17 that is coaxial with the shaft 8. Like the upper gripping arm 9 the upper plate 14 of the member 10 has a curved inner edge, the tree trunk engaging surface of which is broadened by means of a strip of sheet metal standing on edge and welded to the same. Also the lower plate 15 of the member 10 has a curved inner edge but without such a sheet metal strip, and this latter edge has, in addition, a somewhat larger radius than the corresponding edge of the upper plate 14 and is thus somewhat retracted in relation thereto.

The lower plate 15 of the swingable member 10 has a rear or inner portion extending a distance backwards as counted from the shaft 8 and the pivot pin 17 and carrying a vertical pin shaft 18, about which a carrier 19 is swingable a limited angle under the actuation of a hydraulic actuator 20 arranged within the cap-like sheltering member 10. This carrier 19 carries a chain saw 21, or more specifically the guide bar thereof, as well as a hydraulic motor 22 for driving the saw chain thereof. Accordingly the chain saw 21 may be swung out from a protected position of rest within the cap-like member 10 (FIG. 2) to a position of turning back (FIG. 3), which latter position is defined by an abutment 23 mounted on the lower holder plate 5. Irrespective of the diameter of the tree to be felled, the chain saw is thus prevented from working itself entirely through the tree trunk, which in FIG. 3 has been indicated by dash-and-dot lines at 24. Instead there will always remain an uncut trunk segment of a predetermined segment height after the sawing operation, as indicated by the shaded-in field 25 in FIG. 3.

To cut off this remaining segment 25 of the tree trunk 24 and to thereby complete the separation of the tree from the root so that it can be felled and taken care of, there is between the lower portions of the columns 2 in the back structure of the holder 1 secured a pair of parallel channellike guides 30 opening towards each other and forming between them a straight but inclined path for a reciprocatable chisellike cutting blade or tool 31, the plane of which forms an oblique angle, and more specifically approximately an angle of 45°, to the substantially horizontal plane of swing of the chain saw 21. The plane of movement of this guided blade intersects the plane of swing of the chain saw at least approximately along the line, to which the chain saw is allowed to reach or enter during its operative stroke (FIG. 3). The blade 31 has a sharpened lower or front edge 31' and an upper back or rear end edge 32, which is reinforced and to which the lower end of a double-acting hydraulic actuator 33 is connected by means of a substantially horizontal hinge pin 34. The upper end of the actuator 33 is hinged to a transverse shaft 35 secured between a pair of side pieces forming part of a protective cap 36 that partly encloses the actuator 33.

By means of the actuator 33 the cutting blade 31 is movable along the guides 30 between an inoperative position (FIGS. 1 and 3), in which it is entirely above the plane of swing of the chain saw 21 and has its sharpened, lower edge 31' retracted in relation to surrounding portions of the back structure of the holder 1 and thus well protected against unintentional damage, and an operative position (FIG. 4), in which it is projected and has penetrated into the tree trunk 24 gripped by the tree-cutting device in a direction, which, when seen in a horizontal plane, is substantially radial to the tree trunk but, when seen from the side, is obliquely inclined forwardly and downwardly. For making possible a compact construction of the tree-cutting device, the actuator 33 occupies a steeper inclined position than the cutting blade 31, as clearly appears from FIG. 1, whereby the actuator 33 during its stroke will oscillate a small angle about the shaft 35, which fact also appears from FIG. 4.

The cutting blade 31 is sharpened in such a manner to form the cutting edge 31' that its forward side facing obliquely upwards is entirely flat all down to the cutting edge 31', whereas the edge-forming bevel is ground mainly on the back or downwardly facing side of the blade. This means, as appears from FIG. 4, that a completely clean and undamaged cut surface that is oblique in relation to the fiber-direction is obtained in the tree trunk, whereas all possible splitting and distortion of wood will take place in a small crest left behind on the tree stump.

From the drawings it appears that the cutting blade 31 is mounted and movable in the back structure part of the holder 1 which, when the holder is moved forwards into contact with the tree trunk 24, is closest to the lumbering machine, and against the front side of which the tree trunk is then forcibly pressed by the gripping arm 9 and the arm-like sheltering member 10 jointly. Thereby all uncontrollable relative movements between the cutting blade and the tree trunk as well as between the latter and the holder are effectively avoided during the tree cutting and felling operation. The chain saw 21 is on the other hand pivoted in such a manner that, during its operation, it will engage and enter through the side of the tree trunk facing away from the back structure of the holder and hence remote from the lumbering machine, which in its turn gives very favorable sawing conditions. By the fact that the chain saw has a fully protected position of rest within the swingable sheltering member 10, the risk of damages to the chain saw and its guide bar is practically entirely eliminated. The rigidity of the holder 1 is increased, as shown, by means of bracket-like reinforcing plates 26, and 27, respectively, secured between the horizontal holder plates 3, 4 and 5 and the columns 2.

When the tree-cutting device is to be used, the holder 1 is first moved up towards and into contact with the trunk of the tree to be cut, while the gripping arm 9 and the arm-like sheltering member 10 are kept swung out as in FIG. 2. This preparatory operation usually takes place by moving the lumbering machine itself and the supporting arm thereof. Thereafter the gripping arm 9 and member 10 are swung inwardly against the remote side of the tree trunk, whereby the trunk will be reliably held fast against the back structure of the holder in an effective clamping grip. Now the chain saw 21 is started and brought to swing out from the sheltering member 10 by means of the actuator 20 to partially saw through the tree trunk for then to immediately return to its protective position of rest within the member 10. In the next operating step the sharp-edged cutting blade 31 is caused to project by means of the actuator 33 to cut off the remainder of the tree trunk left by the saw, and also during this step the tree trunk is reliably held fast by the holder. Even if it should happen that the tree during the finishing moment of the cutting operation, i.e. when becoming completely separated from its root, because of its heavy weight or under the influence of winds should tend to move not only the tree-cutting device itself but possibly the entire, heavy lumbering machine, with the construction of the tree-cutting device shown and described neither the cutting device itself nor the wood of the trunk will suffer any serious damages. When the tree trunk has been finally separated from its root and stump, the holder 1 may be folded or tilted in order to put down the trunk in a known manner, for instance on a special stand on top of the lumbering machine.

I claim as my invention:

1. A tree-cutting device for lumbering machines of the kind comprising a holder adapted to be moved up to and pressed against the trunk of a tree to be felled, a chain saw pivotally mounted in said holder to swing in a substantially horizontal plane relative thereto, said chain saw having a protected position of rest and being operable, when swung out therefrom, to saw through the tree trunk only partially from one side thereof for then to return to said protected position of rest, and a sharp-edged cutting blade guided in said holder to move in a predetermined plane relative thereto, said cutting blade being operable to penetrate into the tree trunk from generally the opposite side thereof for cutting off the remainder of the trunk left by the chain saw to thereby finally separate the trunk from the root, wherein the plane of movement of said cutting blade forms an oblique angle to the plane of swing of said chain saw and intersects said latter plane at least approximately along the line to which the chain saw reaches during its operative stroke.

2. A tree-cutting device according to claim 1 wherein said cutting blade has an inoperative position in its oblique plane of movement, in which it is entirely above the plane of swing of the chain saw.

3. A tree-cutting device according to claim 2 wherein said cutting blade in its inoperative position has its cutting edge retracted in relation to surrounding parts of the holder and thus protected thereby.

4. A tree-cutting device according to claim 1 wherein said cutting blade has a straight path of movement determined by fixed guides on the holder, said path extending, when seen in the horizontal plane of swing of the chain saw, in a substantially radial direction relative to the tree trunk to be cut.

5. A tree-cutting device according to claim 4 wherein said cutting blade is generally in the form of a guided, inclined chisel having a rear end that is hingedly connected to one end of a hydraulic actuator mounted in said holder and occupying in relation to the plane of swing of the chain saw a steeper position than the plane of movement of said cutting blade.

6. A tree-cutting device according to claim 1 wherein said holder is generally fork-like in horizontal projection and comprises a rigid back structure adapted to be connected to a lumbering machine, and wherein said cutting blade is arranged within and projectable from said back structure of the holder in a forward direction into the tree trunk, whereas the chain saw is mounted in a manner relative to said holder so as to engage, when becoming operative, the side of the tree trunk facing away from said back structure.

7. A tree-cutting device according to claim 6 wherein said chain saw is mounted within a sheltering member that is swingable relative to said holder about a substantially vertical axis, said member forming a gripping arm capable of being swung inwardly against the side of the tree trunk facing away from said back structure of the holder in order to press the tree trunk against said back structure from which said cutting blade is projectable.

* * * * *